(12) United States Patent
Olds et al.

(10) Patent No.: US 7,328,718 B2
(45) Date of Patent: Feb. 12, 2008

(54) AUTOMATIC CHANGEOVER REGULATOR

(75) Inventors: Charles M. Olds, Martindale, TX (US); Edward R. Lee, Martindale, TX (US)

(73) Assignee: S.H. Leggitt Company, San Marcos, TX (US)

( * ) Notice: Subject to any disclaimer, the term of this patent is extended or adjusted under 35 U.S.C. 154(b) by 262 days.

(21) Appl. No.: 10/538,053

(22) PCT Filed: Dec. 9, 2003

(86) PCT No.: PCT/US03/38989

§ 371 (c)(1),
(2), (4) Date: Jun. 8, 2005

(87) PCT Pub. No.: WO2004/053612

PCT Pub. Date: Jun. 24, 2004

(65) Prior Publication Data

US 2006/0151029 A1 Jul. 13, 2006

(51) Int. Cl.
*G05D 16/06* (2006.01)

(52) U.S. Cl. .................. 137/505.46; 137/112; 137/607

(58) Field of Classification Search ................ 137/112, 137/113, 505, 505.12, 505.46, 607
See application file for complete search history.

(56) References Cited

U.S. PATENT DOCUMENTS

| | | | | |
|---|---|---|---|---|
| 2,380,956 | A | | 8/1945 | Evarts |
| 2,630,821 | A | * | 3/1953 | Arey et al. ................. 137/113 |
| 2,687,140 | A | * | 8/1954 | St. Clair ..................... 137/113 |
| 3,001,541 | A | * | 9/1961 | St. Clair ..................... 137/113 |
| 5,103,861 | A | | 4/1992 | Lin ........................ 137/505.12 |
| 5,755,254 | A | | 5/1998 | Carter et al. ................ 137/505 |

* cited by examiner

*Primary Examiner*—Stephen M. Hepperle
(74) *Attorney, Agent, or Firm*—Price, Heneveld, Cooper, DeWitt & Litton, LLP

(57) ABSTRACT

A pressure regulator (10) includes a changeover regulator (12) with plural inlets (16, 18). Inside the regulator, each inlet has a closure member (62) connected to a diaphragm (100) for control of the closure members (62) in response to pressure inside the regulator (12). Biasing members (56) are stabilized in position by either an apertured plate (102), a cup (104) or both. A changeover handle (19) depresses one spring (56) or the other to bias one closure member (62) open to admit gas from the associated inlet (16 or 18).

8 Claims, 6 Drawing Sheets

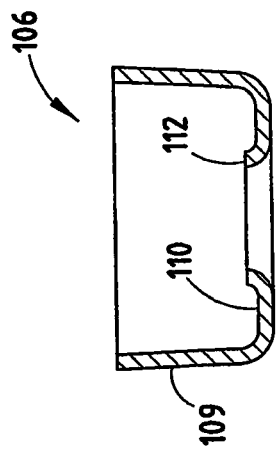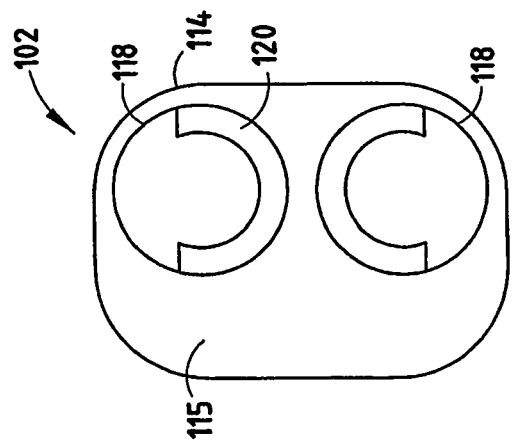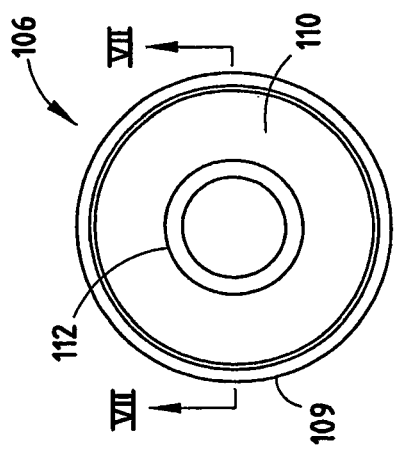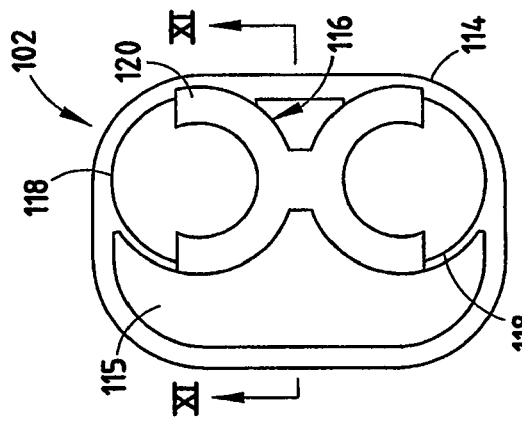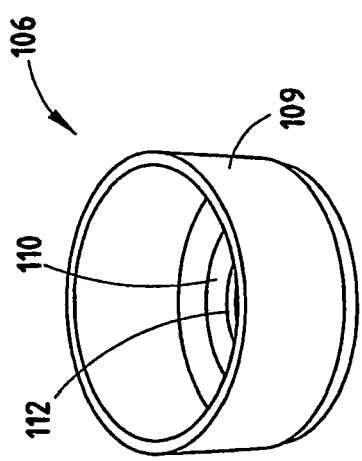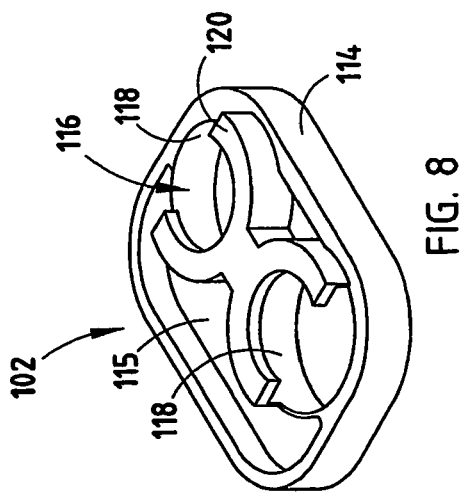

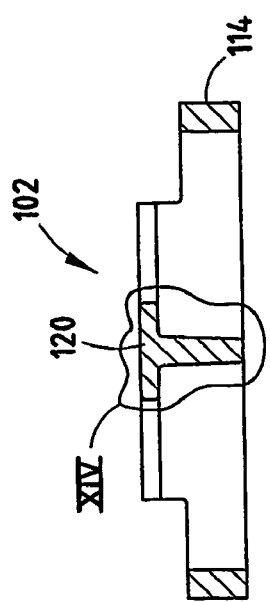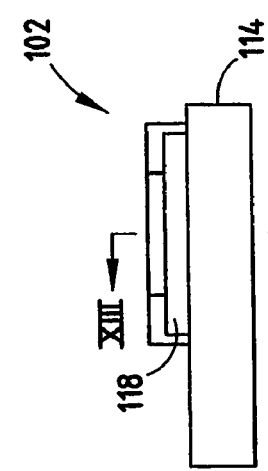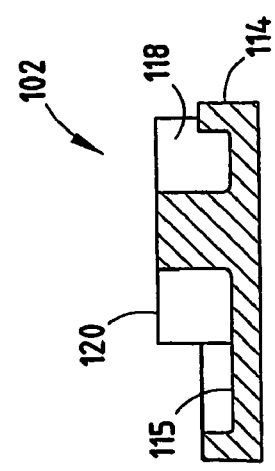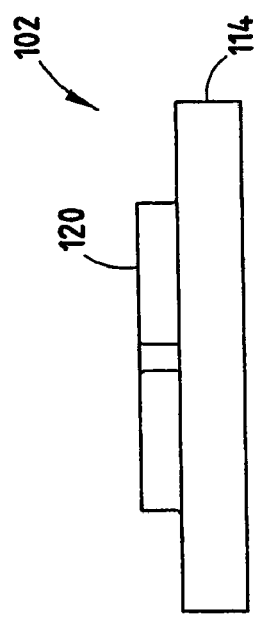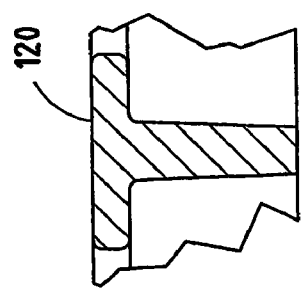

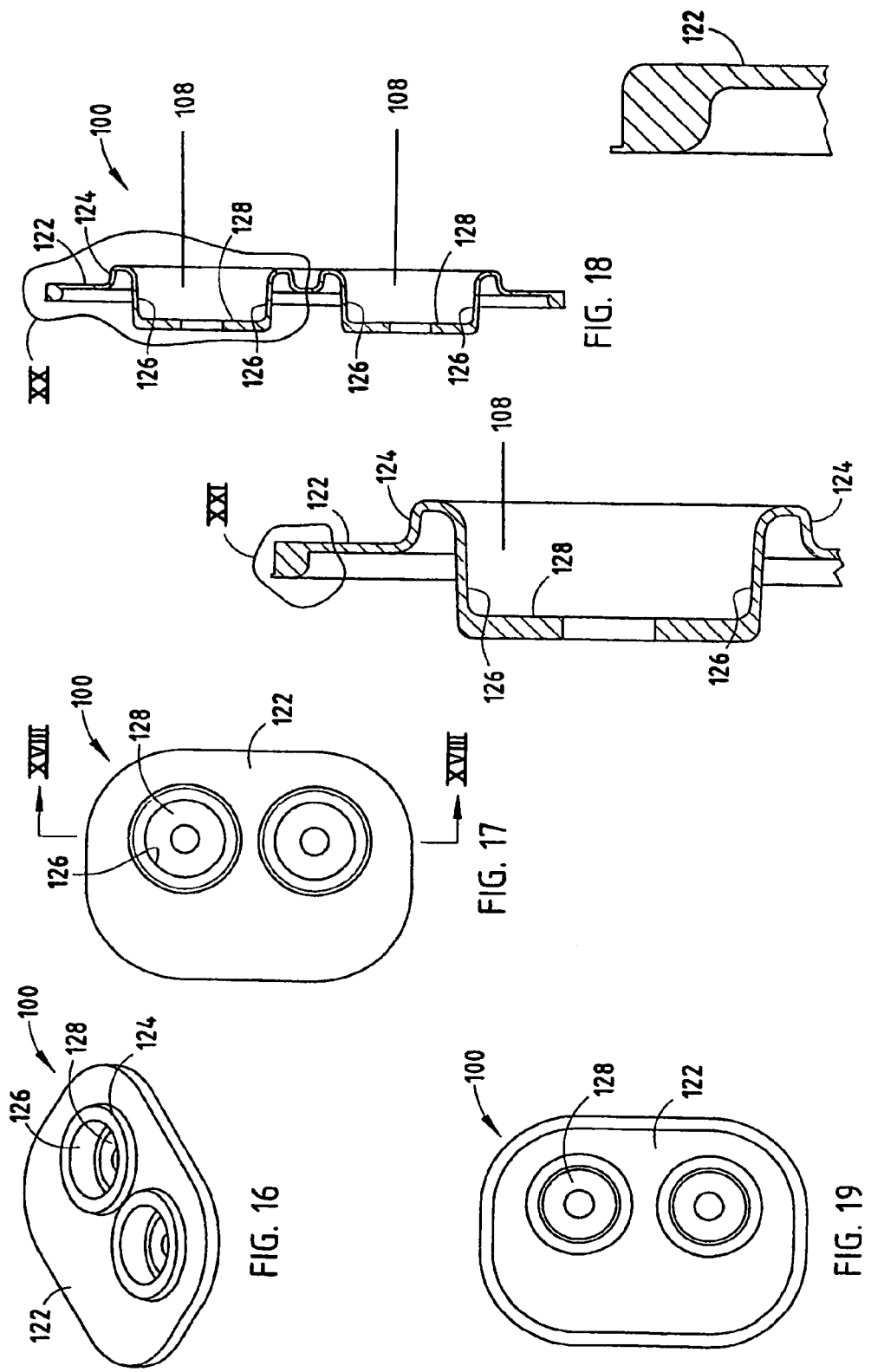

AUTOMATIC CHANGEOVER REGULATOR

BACKGROUND OF INVENTION

The present invention relates to regulators for gas systems and, more particularly, to an automatic changeover two-stage LP gas regulator.

Automatic changeover two-stage LP gas regulators are widely known and used to provide gas to selected appliances at a stepped-down pressure. Automatic changeover regulators, such as the Marshall Gas Controls Model 250, typically include a high-pressure changeover regulator that includes at least one inlet for receiving gas from a pressurized container, reduces the gas pressure to a first predetermined level, and transmits that gas to a second, low-pressure regulator. The low-pressure regulator further reduces the gas pressure to a predetermined level prior to conveying the gas through an outlet to, e.g., an appliance.

In many applications, and particularly in the Recreational Vehicle ("RV") field, at least two gas source containers (a "supply" container and a "reserve" container) are connected to at least two corresponding inlets at the first high-pressure regulator, with each inlet for receiving gas from a different gas source container. During use of the connected appliance, when the supply container becomes depleted of gas, the regulator automatically changes over to the reserve container such that the reserve container becomes the "new supply" container for providing gas to the regulator. After such a changeover, the original supply container can be disconnected from the corresponding inlet of the regulator and be refilled.

SUMMARY OF THE PRESENT INVENTION

One aspect of the present invention is to provide a pressure regulator comprising a housing having an interior space, at least one input into the interior space and an output out of the interior space. The housing is configured to have a fluid enter into the interior space through the at least one input and exit the interior space through the output. The pressure regulator also includes a closure member for each input. The closure member selectively covers an associated one of the at least one input for preventing fluid flow into the interior space of the housing. The pressure regulator further includes a diaphragm in the housing, with the diaphragm being interconnected to the closure member. The pressure regulator also includes a biasing member for each closure member. The biasing member is configured to selectively bias the closure member away from the associated one of the at least one input to allow fluid flow through the input. The diaphragm is configured to move against the biasing member when pressure in the interior space is above a predetermined amount, whereby the closure member will move in response to movement of the diaphragm to close the at least one input such that fluid is not able to pass into the interior space through the input. The pressure regulator further includes a stabilizing member in the housing. The stabilizing member surrounds the biasing member for maintaining the biasing member in position.

Another aspect of the present invention is to provide a pressure regulator comprising a housing, a pair of closure members, a diaphragm, a pair of biasing members and a pair of cups. The housing has an interior space, two inputs into the interior space and an output out of the interior space, with the housing being configured to have a fluid enter into the interior space through at least one of the two inputs and exit the interior space through the output. Each closure member selectively covers an associated one of the two inputs for preventing fluid flow into the interior space of the housing through the associated one of the two inputs. The diaphragm is in the housing and is interconnected to each closure member. Each biasing member is configured to selectively bias one of the closure members away from the associated one of the two inputs to allow fluid flow through the associated one of the two inputs. The diaphragm is configured to move against the biasing members when pressure in the interior space is above a predetermined amount, whereby the closure members will move in response to movement of the diaphragm to close the inputs such that fluid is not able to pass into the interior space through the inputs. Each cup surrounds a bottom of one of the biasing members for maintaining the biasing members in position.

Yet another aspect of the present invention is to provide a pressure regulator comprising a housing, a pair of closure members, a diaphragm, a pair of biasing members and a plate. The housing has an interior space, two inputs into the interior space and an output out of the interior space, with the housing being configured to have a fluid enter into the interior space through at least one of the two inputs and exit the interior space through the output. Each closure member selectively covers an associated one of the two inputs for preventing fluid flow into the interior space of the housing through the associated one of the two inputs. The diaphragm is in the housing and is interconnected to each closure member. Each biasing member is configured to selectively bias one of the closure members away from the associated one of the two inputs to allow fluid flow through the associated one of the two inputs. The diaphragm is configured to move against the biasing members when pressure in the interior space is above a predetermined amount, whereby the closure members will move in response to movement of the diaphragm to close the inputs such that fluid is not able to pass into the interior space through the inputs. The plate has a pair of apertures therein, with each aperture surrounding one of the biasing members for maintaining the biasing members in position.

In another aspect of the present invention, a pressure regulator is provided. The pressure regulator comprises a housing having an interior space, at least one input into the interior space and an output out of the interior space, with the housing being configured to have a fluid enter into the interior space through the at least one input and exit the interior space through the output. The pressure regulator also includes a closure member for each input, with the closure member selectively covering an associated one of the at least one input for preventing fluid flow into the interior space of the housing. The pressure regulator further includes a diaphragm in the housing, with the diaphragm being interconnected to the closure member. The pressure regulator also includes a biasing member for each closure member, with the biasing member configured to selectively bias the closure member away from the associated one of the at least one input to allow fluid flow through the input. The diaphragm is configured to move against the biasing member when pressure in the interior space is above a predetermined amount, whereby the closure member will move in response to movement of the diaphragm to close the at least one input such that fluid is not able to pass into the interior space through the input. Furthermore, the diaphragm includes a pair of sleeves, with each sleeve having a rolling receiver portion and the diaphragm includes a substantially flat surface portion surrounding the sleeve, whereby the rolling receiver portion can move with movement of the biasing member without substantially moving the substantially flat surface portion.

BRIEF DESCRIPTION OF THE DRAWINGS

FIG. 5 is a perspective view of a lower cup of the present invention.

FIG. 6 is a top view of the lower cup of the present invention.

FIG. 7 is cross-sectional view of the lower cup taken along line A-A of FIG. 6.

FIG. 8 is a perspective view of a guide of the present invention.

FIG. 9 is a top view of the guide of the present invention.

FIG. 10 is a bottom view of the guide of the present invention.

FIG. 11 is a cross-sectional view of the guide taken along line A-A of FIG. 9.

FIG. 12 is a front view of the guide of the present invention.

FIG. 13 is a cross-sectional view of the guide taken along line B-B of FIG. 12.

FIG. 14 is a cross-sectional view of the guide illustrating detail A of FIG. 13.

FIG. 15 is a side view of the guide of the present invention.

FIG. 16 is a perspective view of a diaphragm of the present invention.

FIG. 17 is a top view of the diaphragm of the present invention.

FIG. 18 is a cross-sectional view of the diaphragm taken along line A-A of FIG. 17.

FIG. 19 is a bottom view of the diaphragm of the present invention.

FIG. 20 is a cross-sectional view of the diaphragm illustrating detail A of FIG. 18.

FIG. 21 is a cross-sectional view of the diaphragm illustrating detail B of FIG. 20.

DESCRIPTION OF PREFERRED EMBODIMENTS

Figures 1, 2, 3:
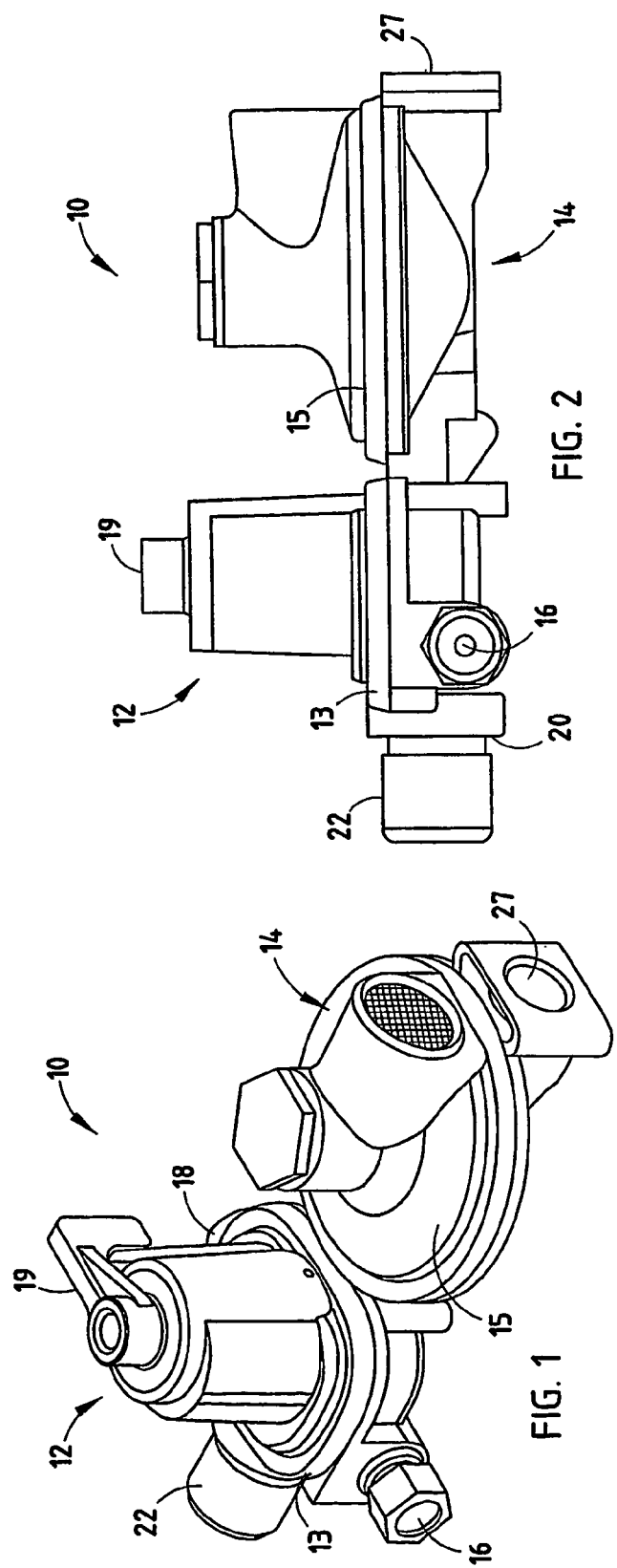
FIG. 1 is a perspective view showing an exemplary gas regulator embodying the present invention.
FIG. 2 is a side view of the gas regulator of the present invention.
FIG. 3 is a front view of the gas regulator of the present invention.
Figure 4:
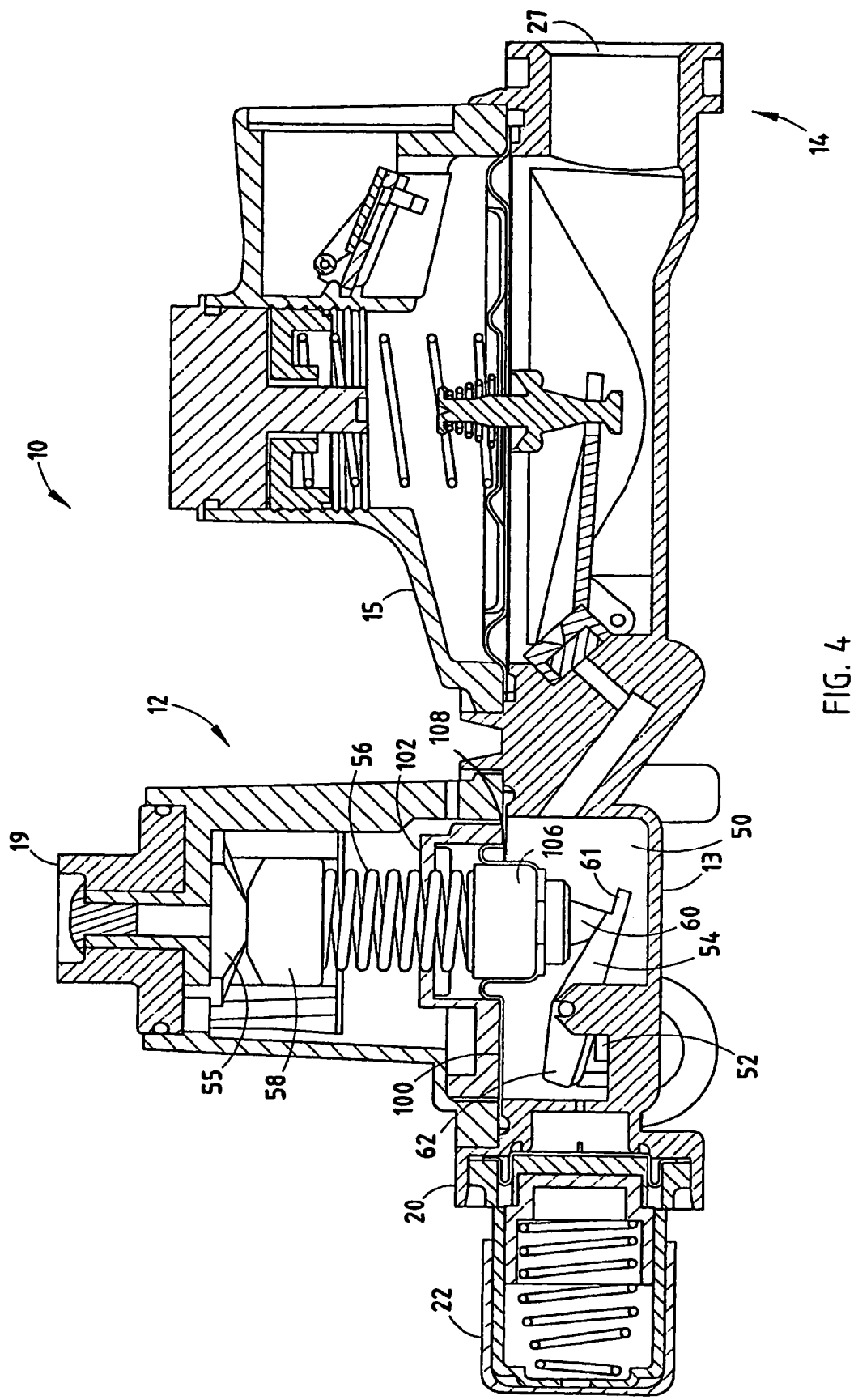
FIG. 4 is a cross-sectional view of the gas regulator taken along line A-A of FIG. 3.
Figure 23:
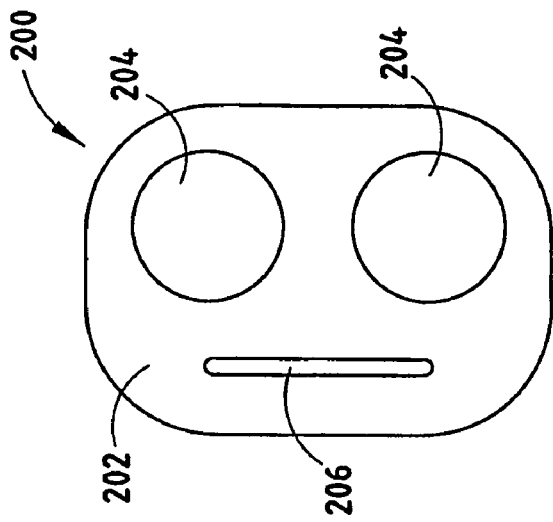
FIG. 23 is a top view of the guide of the second embodiment of the present invention.
Figure 25:
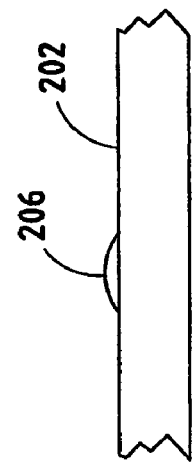
FIG. 25 is a side view of the guide of the second embodiment of the present invention illustrating detail A of FIG. 24.
Figure 22:
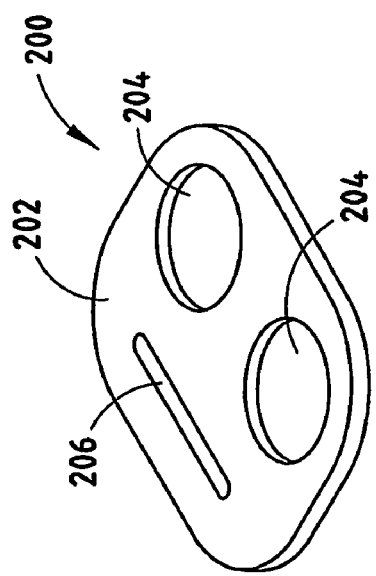
FIG. 22 is a perspective view of a guide of a second embodiment of the present invention.
Figure 24:
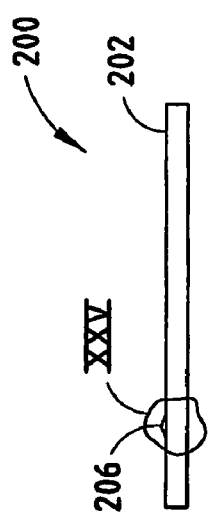
FIG. 24 is a side view of the guide of the second embodiment of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting.

Referring to the drawings, and in particular to FIGS. 1-4, a two-stage LP gas regulator 10 includes a first regulation portion 12 having a high-pressure changeover regulator 13 and a second regulation portion 14 having a low-pressure regulator 15. The first regulation portion 12 includes a pair of inlets 16, 18, each of which receives gas from a separate gas storage container (not shown). The first portion 12 of the regulator 10 also includes a changeover knob 19 for selecting which of the inlets 16, 18 supplies the gas to the high-pressure regulator 13. In operation, the high-pressure changeover regulator 13 processes gas input from one of the inlets 16, 18 by reducing the pressure of the received gas to a predetermined level. The lower-pressure gas is then transmitted to the low-pressure regulator 15 for further reducing the gas pressure to a level that is suitable for use in, e.g., an appliance. As shown in FIGS. 1-4, the second regulator 14 includes an outlet 27 for transmitting the gas to the appliance.

To begin use, the changeover knob 19 is moved toward whichever inlet 16, 18 and container is to be used first, e.g., the "supply" container, thus making the container connected to the other inlet 16, 18 the "reserve" container. Thereafter, a main control valve on each of the gas storage containers is opened such that gas is supplied to both inlets 16, 18. Although both inlets 16, 18 receive gas from their respective gas storage containers, the changeover knob 19 operates an internal mechanism which selectively couples gas received through only one of the inlets 16, 18 to the regulator 10. After opening the main control valves on the gas storage containers, a full/empty indicator 22 attached to an end 20 of the high-pressure regulator 13 senses the pressure of the gas supplied by the selected storage container and, based on the sensed pressure, indicates the full/empty status of that container.

The two-stage LP gas regulator 10 as described herein is identical to a low pressure two-stage LP gas regulator as sold by Marshall Gas Controls, a division of S.H. Leggitt Co. located in San Marcos, Tex., under the part number 254-00, except that the two-stage gas regulator 10 includes a new convoluted diaphragm 100, a guide 102 and a pair of lower spring cups 104 in the first regulator portion 12. In the illustrated example, gas is supplied to an interior 50 of the first regulator portion 12 through the inlets 16, 18 through a valve seat 52 selectively covered by a lever arm 54 for each inlet 16, 18. In use, the changeover knob 19 is rotated to align a protrusion 55 on the underside of the changeover knob 19 with a spring 56 interconnected with one of the lever arms 54 for a selected inlet 16, 18. The protrusion 55 pushes down on a top piston 58, which compresses the selected spring 56. The selected spring 56 therefore pushes a lower cup 106 surrounding a lower end of the spring 56. The lower cup 106 thereafter presses down on a sleeve 108 of the convoluted diaphragm 100, which presses down on a diaphragm post 60 that presses down on a first end 61 of the lever arm 54. When the first end 61 of the lever arm 54 is pressed down, a second end 62 of the lever arm 54 uncovers the valve seat 52 of one of the inlets 16, 18 to open a fluid line from one of the inlets 16, 18 to the interior 50 of the first regulator portion 12. If the pressure in the interior 50 of the first regulator portion 12 raises above a predetermined level, the pressure will push the sleeve 108 of the convoluted diaphragm 100 upward, thereby pushing the diaphragm post 60 upward. Therefore, the diaphragm post 60 will pull the first end 61 of the lever arm 54 upward and move the second end 62 of the lever arm 54 into contact with the valve seat 52 to stop fluid from entering the interior 50 of the first regulator portion 12 from the relative inlet 16, 18.

In the illustrated example, each lower cup 106 (FIGS. 5-7) includes a circular wall 109, a disc-shaped lower plate 110 and an inner circular rim 112. The circular wall 109 surrounds a lower portion of the spring 56 and a terminal lower end of the spring rests on the disc-shaped lower plate 110. The inner circular rim 112 maintains the terminal lower end of the spring on the disc-shaped lower plate 110. The diaphragm post 60 is connected to the lower cup 106 through an opening in the disc-shaped lower plate 110.

The illustrated guide 102 (FIGS. 8-15) is located above the lower cups 106 and provides an upper limit for travel of the lower cups 106. The guide 102 includes a peripheral rim 114 having a cup stopping portion 116 located therein and a base plate 115. The cup stopping portion 116 includes a pair of circular cup jackets 118 that surround a top portion of the lower cups 106. The cup jackets 118 are connected to each other, to the peripheral rim 114 and to the base plate 115. A double wish-bone shaped stop 120 is connected to a top of the cup jackets 118. If the lower cups 106 move too far upward, the lower cups 106 will abut a bottom of the stop 120, thereby preventing upward movement of the lower cups 106. The guide 102 is preferably die cast metal.

In the illustrated example, the convoluted diaphragm 100 (FIGS. 16-21) includes a planar sheet 122 having two sleeves 108 therein. Each sleeve 108 receives one of the lower cups 106. The sleeves 108 are circular and include an upward portion 124 connected to the planar sheet 122, a rolling receiver 126 connected to the upward portion 124 and a bottom plate 128 connected to a bottom portion of the rolling receiver 126. The rolling receiver 126 surrounds the lower cup 106 and the lower cup 106 rests on the bottom plate 128. In use, pressure in the interior 50 of the first regulator portion 12 will press up against the bottom plate 128 of the sleeve 108 when the pressure rises above the predetermined level. As the bottom plate 128 of the sleeve 108 is pushed upward, the rolling receiver 126 will move upward, thereby rolling onto the upward portion 124 to enlarge the upward portion 124.

In a second embodiment of the two-stage LP gas regulator, the gas regulator is identical to the low pressure two-stage LP gas regulator as sold by Marshall Gas Controls, a division of S.H. Leggitt Co. located in San Marcos, Tex., under the part number 254-00, and further includes a spring guide 200 (FIGS. 22-25). The spring guide 200 surrounds the springs 56 and maintains the springs 56 over the respective portion of a flat diaphragm (or a pair of flat diaphragms) and the respective post. The spring guide 200 includes a flat plate 202 with a pair of circular apertures 204. Each of the springs 56 is positioned into one of the apertures 204. The spring guide 200 also preferably includes a stiffening rib 206.

The foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments.

Therefore, it is to be understood that the embodiment shown in the drawings and described above is provided principally for illustrative purposes.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A pressure regulator comprising:

a housing having an interior space, at least one input into the interior space and an output out of the interior space, the housing being configured to have a fluid enter into the interior space through the at least one input and exit the interior space through the output, the housing having a first portion and a second portion;

a closure member for each input, the closure member selectively covering an associated one of the at least one input for preventing fluid flow into the interior space of the housing;

a diaphragm in the housing, the diaphragm including a periphery captured between the first portion of the housing and the second portion of the housing, the diaphragm being interconnected to the closure member; and a biasing member for each closure member, the biasing member configured to selectively bias the closure member away from the associated one of the at least one input to allow fluid flow through the input;

wherein the diaphragm is configured to move against the biasing member when pressure in the interior space is above a predetermined amount, whereby the closure member will move in response to movement of the diaphragm to close the at least one input such that fluid is not able to pass into the interior space through the input; and wherein the diaphragm includes a pair of sleeves, each sleeve having a rolling receiver portion receiving one of the biasing members therein, the diaphragm includes a substantially planar flat surface portion located interior of the periphery of the diaphragm captured between the first portion of the housing and the second portion of the housing, the planar flat portion surrounding the sleeves and being located between the sleeves, whereby the rolling receiver portions can move with movement of the biasing members without substantially moving the substantially planar flat surface portion.

2. The pressure regulator of claim 1, further including:

a stabilizing member in the housing, the stabilizing member surrounding the biasing members for maintaining the biasing members in position.

3. The pressure regulator of claim 2, wherein:

the stabilizing member comprises a cup surrounding a bottom of each biasing member.

4. The pressure regulator of claim 3, wherein:

each sleeve of the diaphragm includes one of the cups therein, whereby each cup is located between the biasing member and the diaphragm.

5. The pressure regulator of claim 3, further including:

a stop for each cup, the stop being located within the housing, the stop configured to abut against a top of the cup to prevent upward movement of the cup past the stop.

6. The pressure regulator of claim 1, wherein:

the housing includes a changeover knob selectively interconnected to one of the closure members, the changeover knob having a first position aligned with a first one of the closure members and a second position aligned with a second one of the closure members;

when the changeover knob is in the first position and the pressure is below the predetermined amount, the first one of the closure members will not cover a first one of the inlets; and when the changeover knob is in the second position and the pressure is below the predetermined amount, the second one of the closure members will not cover a second one of the inlets.

7. The pressure regulator of claim 1, further including:

a plate having a pair of apertures therein, each aperture surrounding one of the biasing members.

8. The pressure regulator of claim 1, wherein:

a transition between the substantially planar flat surface portion and the sleeves is substantially perpendicular.

\* \* \* \* \*